Feb. 15, 1966     K. V. ANDERSON     3,235,756
COOLING STRUCTURE FOR DYNAMOELECTRIC MACHINE
Filed Nov. 7, 1963
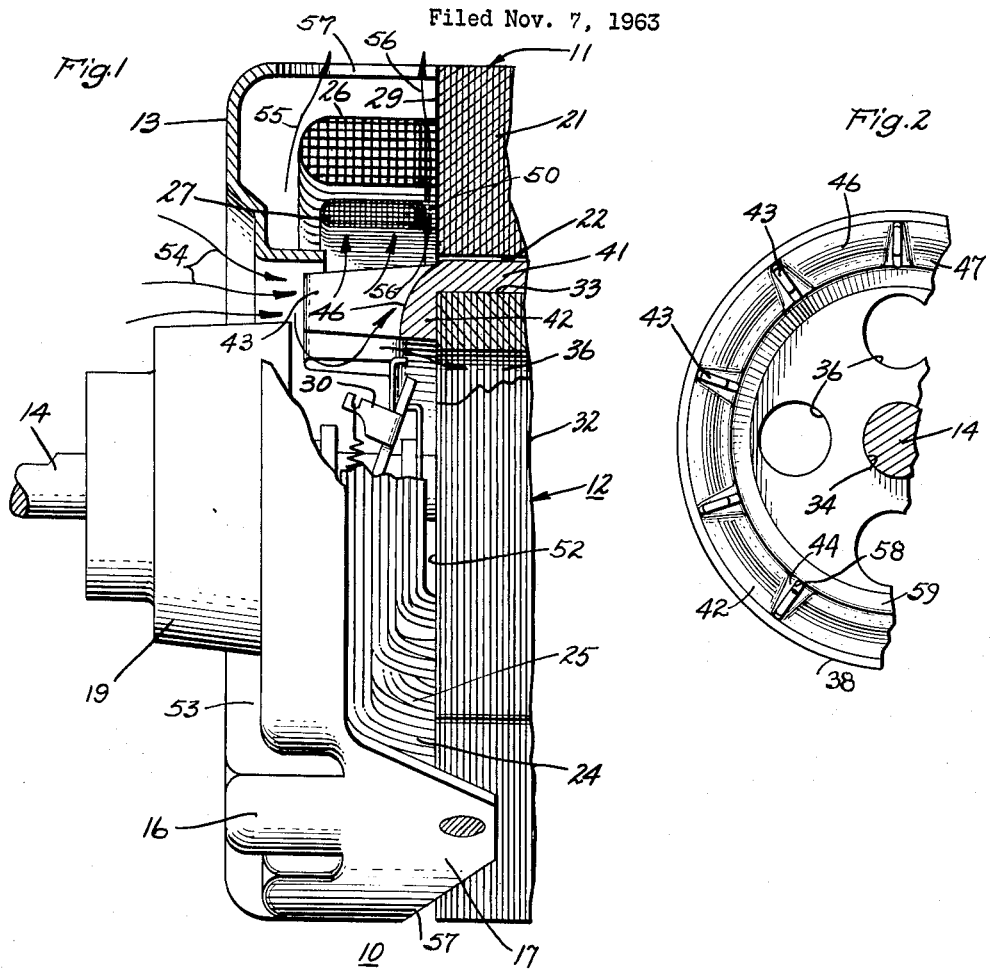
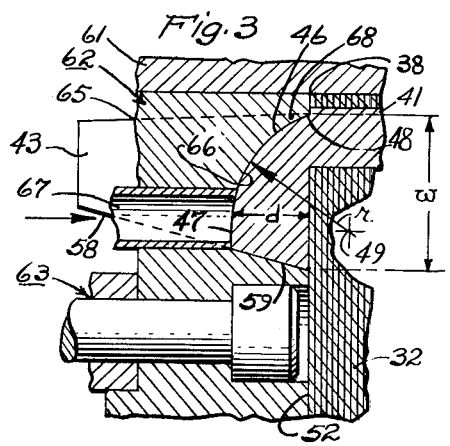
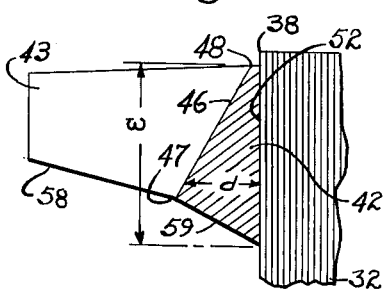
INVENTOR.
Kent V. Anderson,
BY John M. Stoudt
Attorney.

United States Patent Office 3,235,756
Patented Feb. 15, 1966

3,235,756
COOLING STRUCTURE FOR DYNAMOELECTRIC MACHINE
Kent V. Anderson, Sycamore, Ill., assignor to General Electric Company, a corporation of New York
Filed Nov. 7, 1963, Ser. No. 322,192
6 Claims. (Cl. 310—60)

This invention relates generally to dynamoelectric machines and more particularly to an improved rotor of the squirrel-cage type for use in alternating current induction motors.

In the construction of certain kinds of dynamoelectric machines, such as small alternating current split phase single phase induction motors, the machine includes a stator provided with a magnetic core carrying excitation windings, which have end turns projecting axially beyond the sides of the core, and a rotor formed with a die cast permanently short circuited secondary winding. This latter winding normally has angular spaced apart bars projecting axially through a secondary core of the rotor, adjacent its periphery, which are interconnected at each end of the core by annular end rings cast integral with the bars to provide a unitary so-called squirrel cage winding structure.

In order to circulate cooling fluid or coolant, such as air, about the interior of the motor for the purpose of removing heat from the rotor and stator elements during motor operation and in particular from the exposed end turns of the stator windings, it is customary to furnish a number of impeller or fan blades adjacent at least one end of the rotor. These blades are customarily cast circumferentially around and made integral with the associated end rings. In an attempt to augment the cooling effectiveness achieved by the blades and to facilitate the transfer of heat away from the axial center of the rotor core, several passageways are normally furnished entirely through the core, radially inward of the blades.

The foregoing general type of rotor structure, although desirable from the standpoint of simplicity in design, incorporates certain undesirable features. For example, due to the mass of the end ring construction of the secondary winding, there has been a practical difficulty in directing coolant from the rotor blades to the space normally located between the side faces of the stator and the end turns for removing heat from this location.

In addition, in the die casting of the end rings, fan blades and rotor bars, a die is conventionally employed having an elongated stationary cylinder surrounding the core periphery, with a plunger and die plate assembly arranged within the cylinder and movable relative to the side face of the core. The die plate includes spaced apart axial depressions opening into a generally circular cavity somewhat U-shaped in cross section which define respectively the impeller blades and winding end ring. Prior to the present invention, the die plate had a tendency to crack prematurely at the high stress areas of the plate in the vicinity of the blade and end ring connection located near the periphery of the core.

It is therefore a general object of the present invention to provide a dynamoelectric machine with an improved rotor of the cast squirrel-cage type and a more specific object is the provision of an improved rotor formed with a cast winding which overcomes the undesirable features mentioned above.

It is another object of the invention to provide an improved rotor formed with a cast squirrel cage winding having fan blades furnished integral with at least one end ring of the winding which is capable of dissipating the heat in an effective manner from the space located between the winding end turns of the stator winding and the stator core.

It is a further object of the invention to provide an improved rotor having a cast squirrel-cage winding carrying integral impeller blades which permits a strengthening of the dies conventionally used for casting secondary windings and impeller blades and achieves improved control of the effective resistance of the winding.

In carrying out the objects in one form thereof, I provide a dynamoelectric machine with a stator having winding end turns projecting beyond each side face of the stator core and an improved rotor mounted on a shaft having a core furnished with passageways outwardly of the shaft, and a cast secondary winding of the squirrel-cage type. The secondary winding includes an annular end ring disposed in abutting relation to each side face of the core, beyond the passageways. Each end ring has an outer wall which has a maximum axial depth toward the shaft and dimensionally diminishes to a minimum as the wall approaches the outer edge of the rotor core, the change being gradually accomplished for over half of the total radial width of the end ring measured at the side face of the core. The outer wall of the end ring carries circumferentially spaced apart blades which extend across the entire surface of the diminishing part of the end ring wall. With this construction, the end ring and blades cooperate to direct a stream of air around the end turns of the stator winding, and in particular, into the space between the end turns and the side face of the stator to achieve improved heat transfer away from the heat generating parts of the motor. The blades and end ring also function to divert part of the air stream to the rotor passageways for cooling the interior of the rotor core. In addition, due to the outer configuration of the secondary winding end ring, it is possible to form die casting dies or plates with increased strength at high pressure areas located adjacent the outer regions of the die, near the connection of the blades and the end rings. Furthermore, as will become more evident from the discussion hereinafter, the end rings may be utilized to obtain a low effective resistance for the secondary winding, normally achieved by shortening the length of the rotor stack which in turn has the effect of reducing the amount of material in the bars of the secondary winding.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a fragmentary side elevational view, partially broken away, of one end of a dynamoelectric machine incorporating one form of my invention;

FIG. 2 is a fragmentary end view of the secondary member;

FIG. 3 is an enlarged view showing a part of the cast fan and winding end ring arrangement of the secondary member seen in FIG. 1 being formed; and FIG. 4 is an enlarged fragmentary view of a second embodiment of the fan and winding end ring arrangement of the secondary member.

Referring now to the drawing in more detail, and in particular to FIG. 1, the first embodiment of my invention is illustrated as being incorporated in a dynamoelectric machine generally indicated by numeral 10. For purposes of disclosure, machine 10 is a reversible alternating current, single phase induction split phase electric motor and includes a stator 11 and a secondary member or squirrel-cage type induction rotor 12 secured to shaft 14 which is in turn supported for rotation relative to stator 11 by a frame 13. Frame 13 comprises a pair of sheet metal end shields or brackets 16, one secured to the outer surface of the stator 11 at each end of its end, as by welding bracket flange 17 to the stator. A central housing or hub 19 of the bracket mounts a bearing in the standard way to journal the shaft 14. For simplicity of illustration and brevity of discussion, only one end bracket has been shown, but it is understood that the other bracket may be formed identical to the one illustrated.

With respect to the structure of stator 11, it may be conventionally formed with a laminated magnetic core 21 having slots (not shown) for carrying suitable excitation windings radially outward of a rotor receiving bore 22. As shown, the windings include a field or main winding 24 and an auxiliary or start winding 25, with the two windings being physically and electrically displaced one from the other on core 21 in the customary fashion. The main and start windings respectively have end turns 26, 27 projecting axially beyond core side face 28 at either end of the core 21 and are insulated from the core, both in the slots and at the side faces, by any suitable means, such as an adherent continuous coating of cured thermosetting epoxy resin material, indicated at 29.

It will be understood that any standard motor circuit well known to those skilled in the art for energizing the windings to produce reverse operation if desired and therefore the motor circuitry is neither illustrated or set out in detail. Suffice it to say that both windings may be suitably energized during starting conditions and after the motor has attained a predetermined speed in either direction of rotation, the starting winding 25 may be deenergized or open circuited by a conventional speed responsive switch and mechanism 30, such as that disclosed in the Pepper Patent 2,305,441.

Turning now more specifically to the embodiment of rotor 12 seen in FIGS. 1–3, it comprises a plurality of secured together identical punchings or laminations which define a cylindrically shaped magnetic secondary core 32 formed with a number of angularly spaced apart winding slots 33 (FIG. 1) extending axially through the core adjacent its outer periphery. A centrally disposed passageway 34 accommodates shaft 14, the core and shaft being secured together to rotate as a unit by any suitable manner such as an interference fit. Intermediate winding slots 33 and central passageway 34 are arranged cooling ducts 36 to furnish channels through the core for the flow of cooling fluid; e.g., air; for providing a cooling function on the duct walls of the core. The exact number and size of ducts 36 desired for a given application will, of course, be dependent upon several factors, such as the total wall surface of each duct and the exact heat generating characteristics of the motor. Although in the embodiment of FIGS. 1–3, the core includes four equally spaced apart ducts, in general, at least two angularly space apart ducts should be provided. The apertures in the individual laminations which define ducts 36 may also be advantageously used during fabrication of rotor 12 to skew the winding slots at reselected amount for the usual reasons; e.g., reducing the dips in the speed-torque curve and operation noise.

As indicated previously, rotor 12 is of the squirrel-cage induction type. In particular, the secondary winding is of die-cast construction, formed of non-magnetic electrically conducting material such as aluminum. The cast winding structure has conductor bars 41 distributed around the periphery of the core occupying winding slots 33. Bars 41 are integrally joined together at each end of core 32 by a continuous annular end ring 42 which in turn is in abutting relation to the associated side face 52 of the core. A plurality of axially extending fan or impeller blades 43 are furnished circumferentially around each end ring 42. Since the motor of the exemplification is capable of reverse operation, that is, the rotor of the motor can be selectively run in either a clockwise or counterclockwise direction, blades 43 are radial. Bars 41, end rings 42, and blades 43, all being of an integral construction, may be cast in a single die casting operation on core 32 before the core is assembled onto the shaft. This casting operation will be discussed hereinafter in more detail in connection with FIG. 3.

In accordance with an important aspect of the present invention, the construction of end ring 42, fan blades 43, and rotor core 32 are interrelated in a particular way. More specifically, as shown in FIG. 3, end ring 42 is formed with an outer wall 46 defining a cross section or axial depth $d$ for the end ring which gradually diminishes in size for over one-half of its total radial width $w$ (measured at side face 52 of core 32) as the wall approaches outer peripheral edge 38 of the core. In other words, wall 46 has a maximum axial dimension at end ring section 48 in the vicinity of but preferably slightly inward from outer edge 38. In addition, base section 44 of each blade 43 preferably extends entirely across outer end ring wall 46 from maximum section 47 to minimum section 48.

By virtue of this arrangement, revealed by arrows 55 and 56 in FIG. 1, in the motor of the exemplification, blades 43 and the associated end ring 42 together cooperate to direct an unimpeded flow of coolant, such as air, entirely around the winding end turns 26, 27 of the stator and into contact with the side face 28 of the stator. In particular, end ring 42 and blades 43 are especially effective in conveying a large air stream (arrow 56) beneath the end turns to confined space indicated at 50 which lies between the axially inner surfaces of the winding end turns and the side face 28 of the stator. In addition, the air flowing across end ring wall 46 will have a cooling effect on the end ring 42 and on the rotor core. During operation of motor 10, coolant or air may be drawn into the interior of the motor by the rotary motion of blades 43 from the surrounding ambient through suitable intake openings 53 formed in end shield 12 in the manner shown by the arrows 54. It should be noted at this time that inner walls 58 and 59 of blades 43 and end ring 42 slope radially and axially inward toward the shaft and core face 52, with an end ring wall 59 terminating in a circular edge slightly above passageways 36 which extend through the core 32. This slope not only provides a draft angle to facilitate casting of the end ring and blades, but also assists in diverting part of the air flow from the blades into passages 36 for cooling the interior of the rotor core 32. Further, wall 59 is spaced outwardly of and encircles a part of centrifugal mechanism 30, thus allowing an over-all shortening of the total axial length of the motor. A slope of 14° with respect to the axis of the shaft has been very satisfactory in actual practice to achieve these results.

In order to derive the maximum benefits from my invention, that is, the attainment of the most desirable air flow pattern and cooling effectiveness possible, and as will be discussed hereinafter, an improvement in die casting equipment to cast the secondary winding and blades 43, end ring wall 46 should be formed with a convex surface or arcuate configuration in the manner best illustrated in FIG. 3. Curved wall 46 has a center of generation 49 located axially inward of core 32, the radius of curvature $r$ being dimensionally greater than axial depth $d$ at end ring section 47, preferably over 1⅓ times as great to obtain optimum advantage of my invention. This type of wall curvature along with blades 43, create an unusually low resistance air path toward space 50. By way of contrast, in motors which do not incorporate my invention, the air in this space is largely undisturbed by the flow pattern caused by revolving impellers and heat from this confined area is not effectively removed. Once the heat from the heat generating parts of the motor has been transferred to the circulating air, the heated air may be exhausted from the motor interior through an enlarged opening 57.

As indicated previously, another feature of my invention is the improvement in die casting equipment which is permitted or made possible. Referring once again to FIG. 3, the casting operation which produces the secondary winding and blades 43 is partially shown therein. The die casting equipment includes a stationary cylindrical die sleeve 61 and a movable die assembly, denoted at 62, axially slidable within the sleeve. A piston 63 imparts motion to assembly 62 toward and away from side face 52 of core 32 both prior to and after completion of the die operation in the usual way. The die component of assembly 62 includes axial depressions 65 for forming blades 43 and an end ring forming cavity 66 having a surface corresponding in shape to the outer wall 46 and inner wall 59 of end ring 42. Tube 67 conventionally extends through the die component of assembly 62 in communication with cavity 66 for the introduction into depressions 65 and cavity 66 of suitable casting material. With the construction of the present invention, die assembly 62 may be fabricated with an increased radial thickness in the so-called high pressure area 68 of the die, that is, where it fits against the core and stationary cylinder 61 adjacent the peripheral edge 38 of the core 32, in the vicinity of the connection between blade base section 44 and end ring wall 46. Also, flashing of the casting material at edge 38 is avoided with the use of the illustrated embodiment under consideration. In actual practice, I have found that dies constructed in the manner revealed in FIG. 3 have increased die life over those previously employed in the casting of conventional end ring and blade arrangements referred to above.

Another advantage of the present invention resides in the control afforded of the effective resistance of the secondary winding, a function of the current path in the winding, by the formation of end ring 42 in accordance with the first embodiment. Generally speaking, the lower the effective resistance of the secondary winding of the single phase induction motor, the higher will be the speed and efficiency under operating conditions. Prior to my invention, a low effective secondary winding resistance was usually obtained for the squirrel-cage winding by reducing the stack length of the rotor; i.e., reduction of the number of rotor laminations used to form the stack. This reduced the axial length of the winding bars which shorten the current path in the winding. Unfortunately, this approach resulted in a corresponding reduction in magnetic material for the magnetic path in the rotor and an adverse affect on the maximum torque characteristics of the motor.

With the use of my invention, end ring 42 provides a low effective resistance for the secondary winding since it is possible to form the end ring with a smaller volume of material to provide a given total end ring cross section area. Stated another way, by constructing the end ring in accordance with FIG. 3, I am able to furnish a secondary winding with a lower effective resistance than heretofore possible for a given rotor stack length and volume of material in the end ring. This may be due, at least in part, to the fact that in the first embodiment, the center of mass of end ring 42 will probably lie near maximum section 47 toward inner end ring wall 59.

Referring now to FIG. 4 which shows a second embodiment of the present invention, like reference numerals illustrate like parts. The end ring 42 and blade 43 construction is essentially the same as that described for the first embodiment defferentiating therefrom principally in the configuration of outer wall 46 and inner wall 59 of the end ring. In particular, the total cross section of end ring 42 is generally triangular in configuration, with outer wall 46 sloping at a constant rate from the maximum to the minimum locations 47 and 48. To achieve the maximum benefit of a low effective resistance for the secondary winding in this embodiment, it is desirable to form wall 46 such that radial width $w$ of the end ring is approximately twice the size of its axial depth $d$. Accordingly, inner wall 59 has a draft angle somewhat greater than that of the first embodiment. The flow pattern created by the second embodiment, however, is slightly less effective than that for the first embodiment, but it does permit an improvement in die life in the same manner as previously described in connection with FIG. 3 and the first embodiment.

The advantages and desirable features of the present invention are readily manifest from the foregoing description. For example, a motor incorporating the present invention will have improved heat transfer characteristics from the heat generating parts of the motor to the coolant being used. In addition, the dies employed to cast the secondary winding may be strengthened in the high pressure areas to insure a longer die life. Moreover, the effective resistance of the secondary winding can be controlled by the configuration of the end rings and, if such is desired, for any given volume of end ring material, the effective resistance can be minimized without resorting to a reduction in the axial length in the rotor itself.

While in accordance with the patent statutes, I have described what at preesnt is considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A dynamoelectric machine comprising a stator including a magnetic core having winding accommodating means and a bore, and coils carried by said means outwardly of said bore, said coils having end turns extending axially beyond each side face of said core; a rotor mounted on a shaft for rotation relative to said stator; said rotor including a secondary core and a secondary squirrel-cage winding, said secondary winding including a number of angularly spaced apart conductor bars extending axially through the secondary core and an end ring joining said conductor bars together at each end of said secondary core, at least one of said end rings having an inner wall spaced outwardly from said shaft and an outer wall defining a maximum axial end ring depth near said inner wall and a minimum axial end ring depth adjacent the outer periphery of said secondary core, the axial depth of the end ring gradually diminishing from said maximum to minimum depths for over half of the total radial width of said end ring as measured at the side face of said secondary core, a number of fan blades formed circumferentially around said end ring on said outer wall, said blades and associated end ring together directing coolant around said stator winding end turns into contact with said stator side faces disposed behind said end turns for removing heat from the heat generating parts of the motor.

2. The dynamoelectric machine of claim 1 in which the diminishing portion of said end ring outer wall is of arcuate configuraton having a radius of curvature dimensionally greater than the maximum axial depth of said end ring to produce a secondary winding having a low effective resistance.

3. The dynamoelectric machine of claim 2 in which the radius of curvature of said outer wall is at least 1⅓ as great as said maximum axial depth and said fan blades extend across substantially the entire surface of said diminishing portion of said outer wall.

4. A dynamoelectric machine comprising a stator including a magnetic core having winding accommodating means and a bore, and main and auxiliary windings carried by said means outwardly of said bore, said windings each having end turns extending axially beyond each side face of said core; a rotor mounted on a shaft for rotation relative to said stator; a centrifugal mechanism carried by said shaft for deenergizing the auxiliary winding after the motor attains a pre-selected speed, said rotor including a secondary core and a secondary cast squirrel-cage winding formed of non-magnetic electrical conducting material, said secondary winding including a number of angularly spaced apart conductor bars extending axially through the secondary core and an end ring integrally joining said conductor bars together at each end of said secondary core, one of said end rings having an inner wall surrounding a part of said centrifugal mechanism and an outer wall defining a maximum axial end ring depth in the vicinity of said inner wall and a minimum axial depth adjacent the outer periphery of said secondary core, the axial depth of the end ring gradually changing from said maximum to minimum depths for over half of the total radial width of said end ring as measured at the side face of said secondary core, a number of axially projecting fan blades formed circumferentially around said end ring on said outer wall, said blades and associated end ring together directing coolant around said stator winding end turns and into contact with said stator side face disposed behind said end turns for removing heat from the heat generating parts of the motor, said end ring providing said squirrel-cage winding with a low effective resistance.

5. A dynamoelectric machine comprising a stator including a magnetic core having winding accommodating means and a bore, and coils carried by said means outwardly of said bore, said coils having end turns extending axially beyond and spaced from each side face of said core; a rotor mounted on a shaft for rotation relative to said stator; said rotor including a secondary core having passageways outwardly of said shaft extending axially therethrough and a cast squirrel-cage winding formed of non-magnetic electrical conducting material, said winding including a number of angularly spaced apart conductor bars extending axially through the secondary core and an end ring integrally joining said conductor bars together at each end of said secondary core, each of said end rings having an inner wall disposed toward said shaft outwardly of said passageways and an outer wall defining a maximum axial end ring depth in the vicinity of said inner wall and a minimum axial depth adjacent the outer periphery of said secondary core, the axial depth of the end ring gradually changing from said maximum to minimum depths for over half of the total radial width of said end ring as measured at the side face of said secondary core, a number of axially projecting fan blades formed circumferentially around said end ring on said outer wall and extending across substantially the entire surface of the gradually changing part of outer wall, said blades and end ring together directing coolant into said passageways of said secondary core and around said stator wall end turns into contact with said stator side faces disposed behind said end turns for removing heat from the heat generating parts of the motor under operating conditions, said end rings providing said squirrel-cage winding with a low effective resistance.

6. A rotor and shaft assembly for use in a dynamoelectric machine comprising a shaft, a rotor core mounted on said shaft for rotation therewith, a cast squirrel-cage winding formed of non-magnetic electrical conducting material carried by said core, said winding including a number of angularly spaced apart conductor bars extending axially through the core and an end ring integrally joining said conductor bars together at each end of said core, each of said end rings having an inner wall spaced outwardly from said shaft and an outer wall terminating at one end of said inner wall and at the other end at the side face of said core, said outer wall defining a maximum axial end ring depth adjacent said inner wall and a minimum axial end ring depth adjacent the outer periphery of said core, said outer wall having a convex surface curving gradually from said maximum to minimum depths for over half of the total radial width of said end rings as measured at the side face of said core, the radius of curvature of the curve being dimensionally greater than the maximum axial depth to form a squirrel-cage winding having a controlled effective resistance.

References Cited by the Examiner
UNITED STATES PATENTS 2,753,473   7/1956   Hamm _____ 310—60
3,164,736   1/1965   Sleeter _____ 310—261 X ORIS L. RADER, *Primary Examiner.*

L. L. SMITH, *Assistant Examiner.*